United States Patent [19]
Sniegowski

[11] Patent Number: 5,649,423
[45] Date of Patent: Jul. 22, 1997

[54] MICROMECHANISM LINEAR ACTUATOR WITH CAPILLARY FORCE SEALING

[75] Inventor: Jeffry J. Sniegowski, Albuquerque, N. Mex.

[73] Assignee: Sandia Corporation, Albuquerque, N. Mex.

[21] Appl. No.: 255,131

[22] Filed: Jun. 7, 1994

[51] Int. Cl.⁶ .................................................. F03G 7/00
[52] U.S. Cl. ........................... 60/531; 60/516; 60/370
[58] Field of Search .......................... 60/516, 530, 531, 60/370

[56] References Cited

U.S. PATENT DOCUMENTS

| | | | |
|---|---|---|---|
| 3,183,672 | 5/1965 | Morgan | 60/516 |
| 4,016,722 | 4/1977 | Niederer, Sr. | 60/530 |
| 4,104,507 | 8/1978 | Tisone et al. | 60/531 |
| 4,742,678 | 5/1988 | Bartholomew et al. | 60/516 |

*Primary Examiner*—Stephen F. Husar
*Assistant Examiner*—L. Heyman

[57] ABSTRACT

A class of micromachine linear actuators whose function is based on gas driven pistons in which capillary forces are used to seal the gas behind the piston. The capillary forces also increase the amount of force transmitted from the gas pressure to the piston. In a major subclass of such devices, the gas bubble is produced by thermal vaporization of a working fluid. Because of their dependence on capillary forces for sealing, such devices are only practical on the sub-mm size scale, but in that regime they produce very large force times distance (total work) values.

25 Claims, 8 Drawing Sheets

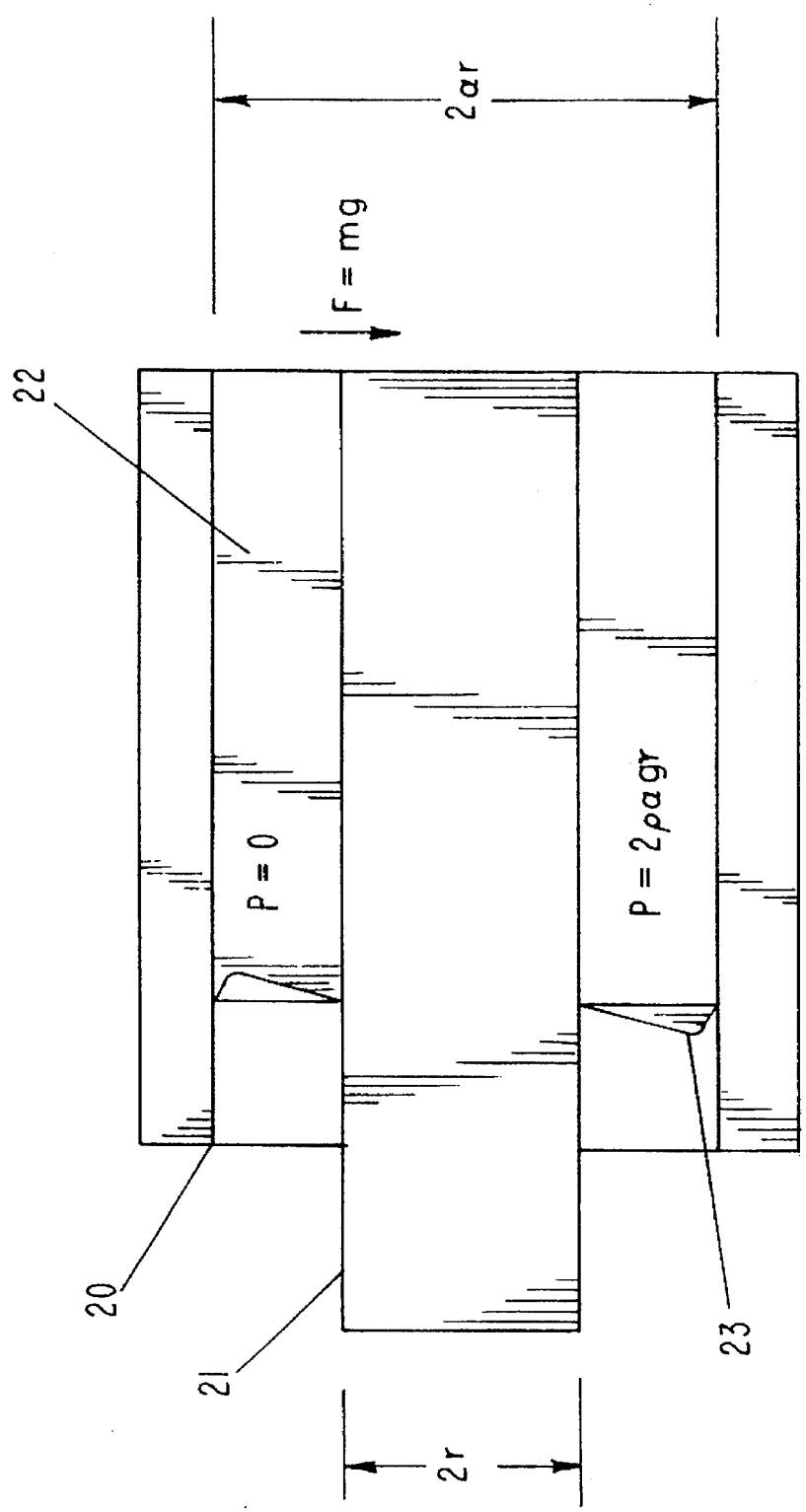

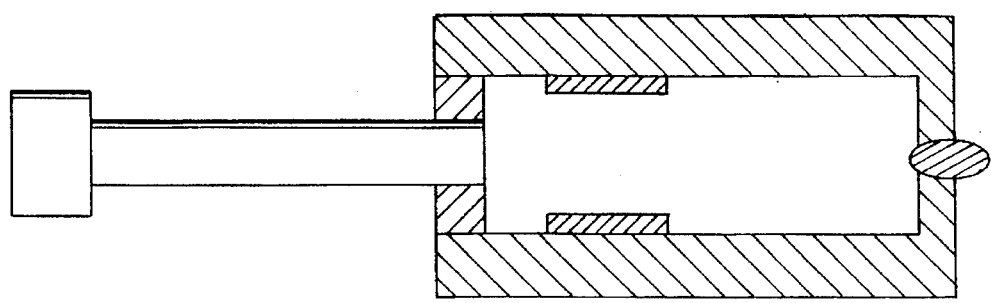
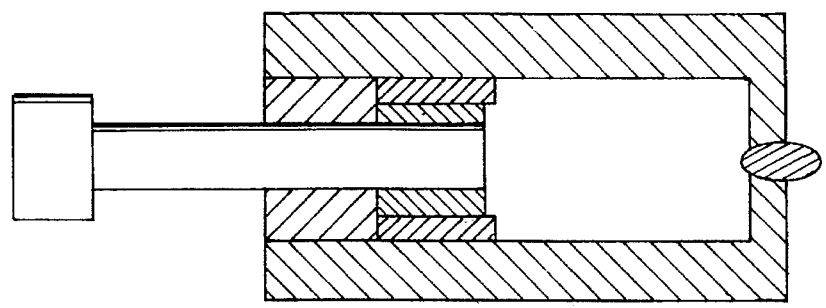
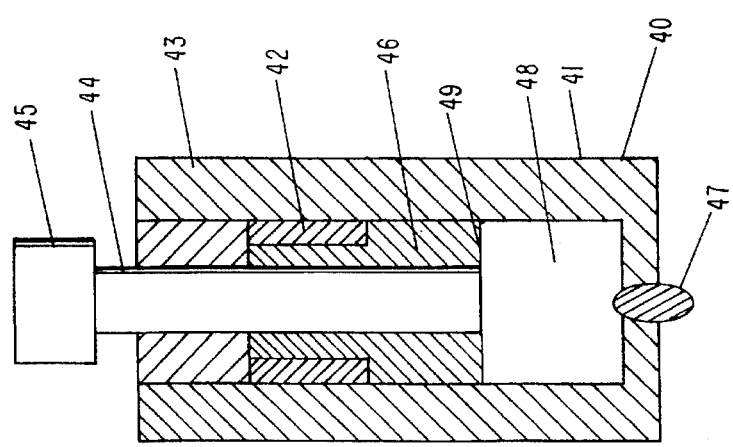

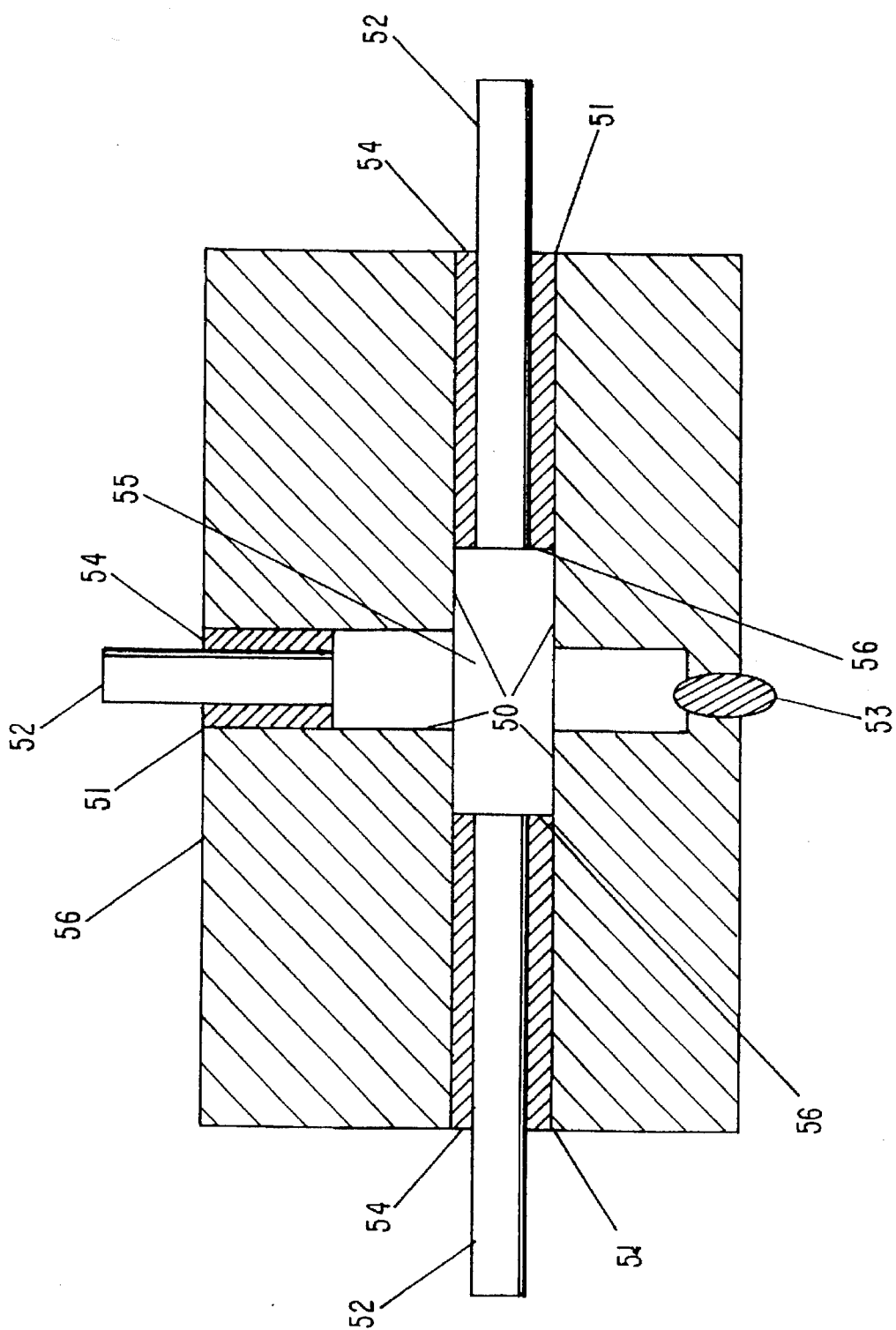

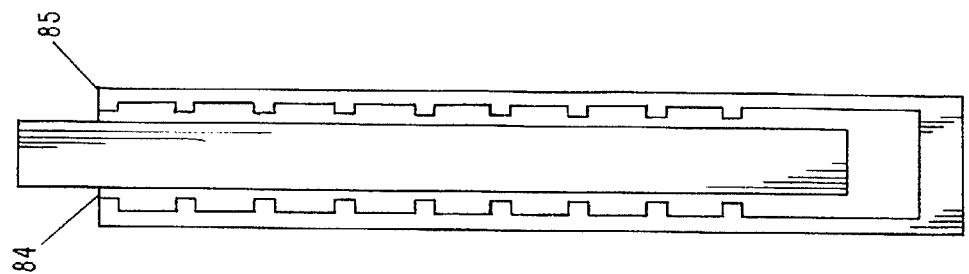
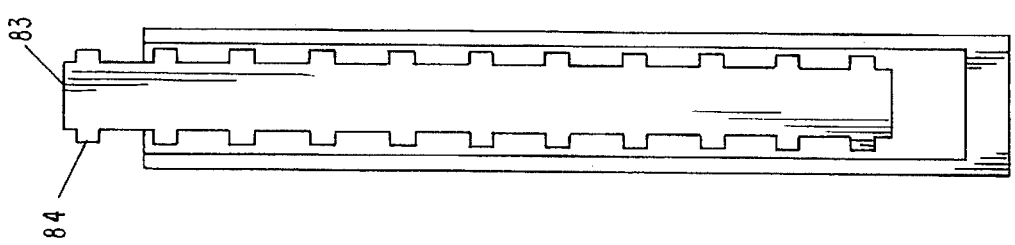
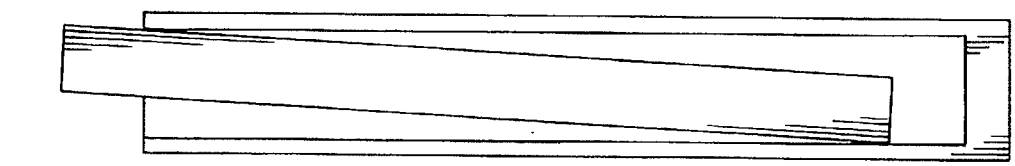
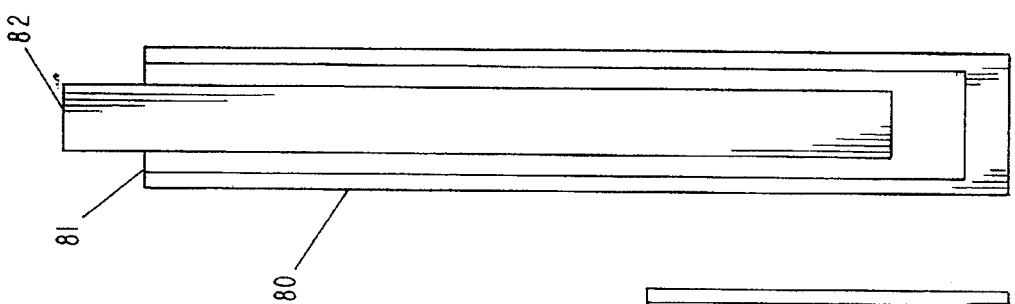
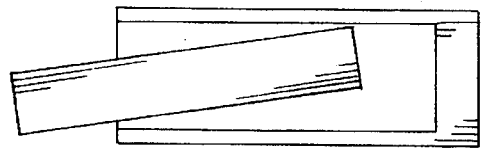

MICROMECHANISM LINEAR ACTUATOR WITH CAPILLARY FORCE SEALING

BACKGROUND

This invention addresses the general problem of motive power for micromachines, i.e., those mechanical devices whose individual components are typically between 1 μm and 1000μm in size. The essence of the current invention is the introduction of gas pressure-driven pistons which use capillary forces to seal the working fluid in the working device and to transmit the forces which result from the pressure acting on the working fluid to the piston. The result is a new class of microminiature linear activators which make available piston forces some 2–3 orders of magnitude larger than do conventional electrostatic microactuators at similar operating voltages.

In the field of micromechanical technologies, there is a great need for devices which can provide useful work to active micromechanical assemblies. (For the purposes of this application, an active micromechanical assembly would be a micromachine having driven moving parts, for example a gear train, whereas a passive micromechanical assembly would depend on the deformation of fixed elements, such as cantilevers, in response to external motion or other external conditions.) The same need is commonplace on the macroscopic scale; an assembly of gears and pivots and linear motion guides is not a lathe until some source of motive power is added. On the macroscopic scale such motive power is often provided by internal and external combustion engines, although the energy provided by these sources may first be transformed into forms useable by electric motors or hydraulic actuators, which devices may directly drive the desired assembly.

Unfortunately, the standard macroscopic sources of motive power do not scale well into the microscopic regime with which we are currently concerned. They are either too complicated to manufacture at such dimensions or the physical laws that govern their operation do not scale favorably, resulting in inadequate performance. Several types of motive power have been investigated in the prior art for application in the microscopic regime, notably electrostatic motors, piezoelectric drives, and thermal bimorphs, and these have proven useful in some cases. In general, however, the force produced is limited, and/or is available over a rather small range of linear displacement, and hence is not adequate for a large number of potential applications. Further, some of the available options (piezoelectric drives, thermal bimorphs, and others) do not adapt easily to integrated circuit processing techniques, an important factor for applications requiring many actuators or when many complete mechanisms must be built.

For the foregoing reasons, there is a need for a new type of microminiature linear activator that provides accessible work per operating cycle (force x length of stroke) vastly greater than is achievable using currently available microscopic actuators. A further need is for such a device that is easily manufactured in large quantities on a silicon wafer (the current arena for development of micromachines) using fabrication techniques compatible with the enormous suite of techniques developed for fabrication of integrated circuits.

SUMMARY

The present invention is directed to a new class of microminiature linear activators that satisfies the aforementioned needs. This class of devices comprises the harnessing of vapor pressure, controllably produced through the action of a heating means on a working fluid or by a gas manifold system, to drive the linear motion of a piston in a cylinder bore. The working fluid is sealed within the actuator (thus preventing blowby of the vapor) by capillary forces alone. These same capillary forces act to couple the force of the vapor pressure acting over the cross-sectional area of the cylinder bore onto the piston. As the piston in this size regime may be considerably smaller than the cylinder bore, this coupling acts to substantially increase the ultimate force of such devices. For μm-scale devices, the force generated is some 2–3 orders of magnitude greater than that from prior art electrostatic comb-drive devices, and the range of piston displacement is many times the piston "diameter". (As the piston is usually not round, the term "diameter" will be used as representing a characteristic cross-sectional dimension when the piston has a cross-sectional aspect ratio near one. If a round piston or cylinder bore is being discussed, its size will be expressed as a radius.) The needs identified in the Background are all addressed by this invention, which provides a compact, controllable, and powerful source of linear motive power for micromachines. A subclass of such devices can be micromachined on silicon wafers using standard silicon micromachining techniques. Numerous embodiments and other features, aspects, and advantages of the present invention will become better understood with reference to the following descriptions and appended claims.

BRIEF DESCRIPTION OF THE DRAWINGS

FIG. 2 is a cross section view illustrating the principle of capillary sealing applied to constraining the working fluid inside an actuator.

FIGS. 3A, 3B, and 3C are cross sectional views showing an actuator having a cylinder bore of variable cross-sectional area.

FIG. 4 is a cross section view showing an actuator having a plurality (in this case, three) of pistons.

FIGS. 7A–7E are cross section views showing two different piston alignment approaches.

DESCRIPTION

Figure 1:
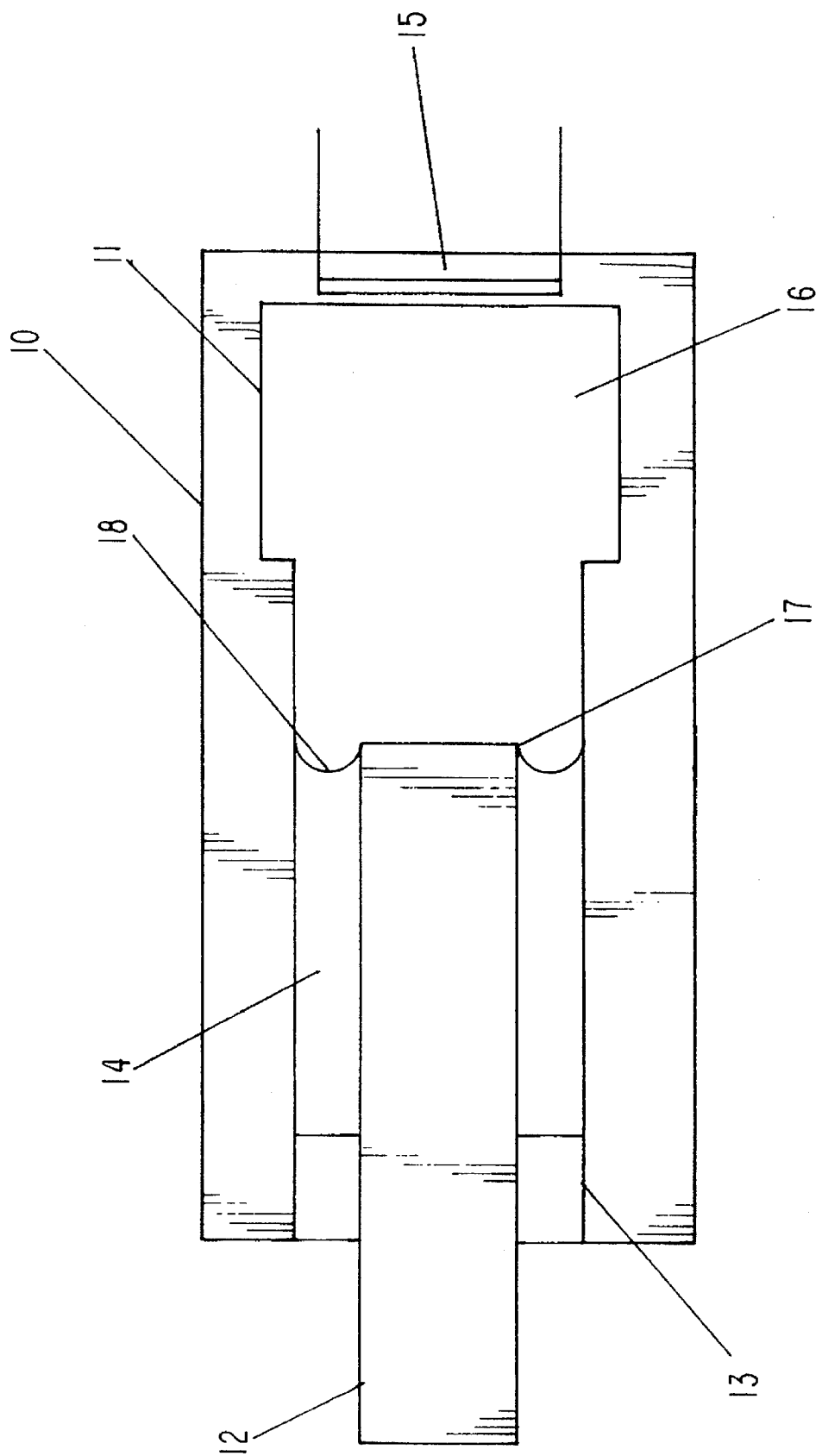
FIG. 1 shows a schematic cross-section of a simple implementation of the present invention.

The essence of the present invention is illustrated schematically in FIG. 1. The miniature actuator comprises a body 10 which is essentially impermeable to gas and liquid. By a series of conventional micromachining processing steps, a cavity is formed in body 10 to form pressure chamber 11. A cylinder bore 13 is similarly formed in body 10 to connect said pressure chamber to the exterior of body 10. A piston 12 is located within said cylinder bore 13. The mutual dimensions of piston 12 and cylinder bore 13 allow non-binding linear motion of piston 12 along the axis of the cylinder bore 13. Piston 12 is pressing against some means (not shown) which provides a restoring force against motion to the left in the FIG., and which prevents piston 12 from completely exiting the cylinder bore 13.

The combined void defined by pressure chamber 11, cylinder bore 13, and piston 12 is partially or wholly filled with a working fluid 14, said fluid being liquid (at the normal range of temperatures found exterior to the device) and capable of wetting the surface of piston 12. Heating element 15 is located near the pressure chamber and, when activated, serves to vaporize a portion of the working fluid 14, creating vapor bubble 16. The volume of vapor bubble 16 increases monotonically with increasing heat input from element 15, which is controlled by a controlling means (not shown). (It is also possible in principle to form the vapor bubble 16 by a forming means comprising a source of pressurized gas, a feed valve, and a bleed valve. However this class of embodiments requires special design to avoid capillary sealing at the access holes for the feed and bleed valves. For the present the forming means will be assumed to be thermal in nature as described above.)

When the surface of said vapor bubble 16 reaches the shoulder 17 of the piston 12, a capillary meniscus 18 forms between the shoulder 17 and the cylinder bore 13. As the vapor bubble 16 continues to increase in volume, the vapor begins to push into the interstices between the piston 12 and the cylinder bore 13. As the working fluid 14 wets the surface of the piston 12, the capillary meniscus 18 remains attached to the shoulder 17 until a critical contact angle at the piston surface is exceeded. Thus, the capillary meniscus 18 bulges to the left in the FIG., increasing its surface area and thus its energy. The system as a whole will attempt to adjust to reduce this energy, but, as long as the capillary meniscus 18 remains attached to the shoulder of the sealing end the only path toward such reduction is for piston 12 to move to the left in the FIG., thus reducing the surface area of the capillary meniscus 18. Piston 12 therefore experiences a force to the left as the vapor bubble 16 grows.

The force described above is capillary in nature, and exists in addition to the pressure of the vapor bubble 16 on the end of the piston 12. The principles of capillary effects are well-known in the art. In particular, the capillary force scales as the circumference of the sealing end of the piston 12, whereas the vapor pressure on the end of the piston 12 scales as the area of the piston. As the size of the actuator decreases, therefore, the proportion of the force on the piston 12 due to capillary effects increases. The exact dimensions associated with crossover to capillary dominance (i.e., those conditions under which more than half of the piston force is transmitted to the piston by capillary forces) depends on the design of the actuator, but will generally occur when the piston 12 has an area less than about 10–100 square microns.

Note that the capillary meniscus 18 also provides the only means to seal in the pressure of the vapor bubble 16, whereas prior art electrothermal actuators of this general type depend on conventional sealing means, such as o-rings or moving diaphragms. The present miniature actuator is thus simpler in design than prior art, as well as dependent on a different physical phenomenon both for transfer of force and for sealing of gas. The capillary seal will be effective until the pressure in the vapor bubble is great enough that the capillary meniscus 18 detaches from the piston shoulder 17. This is the exact point when the capillary transfer of force to the piston 12 fails. Accordingly, the capillary sealing functions throughout the operating range of the actuator. Note that the above discussion concerns an extremely simplified device so that the principles of operation may be succinctly expounded, and should not be taken to limit the scope of the current invention.

The external environment of this type of actuator is also important. For example, if the actuator is surrounded by a liquid which is mutually soluble with the working fluid but has a much higher heat of vaporization, the actuator will eventually stop working as expected, as the heating power required to produce a given amount of force will greatly increase. Any such liquid environment, where substitution of the working fluid with the environmental liquid will significantly alter the operational properties of the actuator, will be called incompatible with the working fluid. On the other hand, if the environmental liquid has similar properties to those of the working fluid, an actuator will continue to operate properly in that environment, and the environmental liquid and working fluid are compatible. Another case is when the environmental liquid and the working fluid are mutually immiscible. Here intermixing does not occur, and the operation of the actuator is unaffected. Finally, when the external environment is gaseous, the capillary meniscus formed at the interface between the working fluid and the atmosphere serves to seal the working fluid in the actuator, except for a small amount of evaporative loss. The actuators made possible by the present invention will operate successfully in a wide range of external environments, but the working fluid must be carefully chosen to match the working conditions.

It is necessary to briefly explain the source and certain properties of the capillary force on a piston in an actuator of the type illustrated in FIG. 1 and described above, so that design of non-functional devices can be avoided. As mentioned above, the force on the piston is generated by the deformation of the capillary meniscus as the pressure of the vapor bubble increases. This deformation increases the surface area of the capillary meniscus; since this surface has a positive energy, the energy of the system also increases upon deformation. There is thus a restoring force generated to reduce the surface area of the capillary meniscus. This restoring force is countered by the attachment of the capillary meniscus to the shoulder of the piston. As the meniscus is attached to said shoulder until a critical geometric condition is satisfied, the restoring force is transmitted to the piston.

It is clear from the above that the ultimate source of the capillary force on the piston is simply the pressure of the vapor bubble on the capillary meniscus. The capillary meniscus thus serves to concentrate the on-axis force from the vapor pressure on the meniscus to act on the piston. As the piston also experiences this pressure on its end, the total force pushing the piston out of the actuator is a function of the pressure in the vapor bubble multiplied by the cross-sectional area of the cylinder bore, rather than that of the piston. In large actuators having close tolerances this difference is negligible. However, in micron-sized devices having cylinder bore-piston clearance on the order of the piston dimensions, the concentration of force by capillary interactions can be quite significant. For example, if the piston is 2 µm in diameter and the cylinder bore is 4 µm, capillary forces increase the force on the piston by a factor of 2 over the simple action of vapor pressure on the end of the piston. The capillary seal thus not only decreases complexity of the actuator, but increases operating effectiveness.

The amount of force that can be transmitted to the piston by the capillary meniscus is determined by the surface tension $\gamma$(dynes/cm) characterizing the vapor-liquid interface of the working fluid. The surface tension of water is representative of potential working fluids at some 70 dynes/cm. The capillary force transmitted is $$F_{cap} = 2\pi r \gamma \cos\theta \qquad (1)$$

where r is the radius of the piston (assumed to have a round cross-section for this discussion) and $\theta$ is the critical angle of wetting. θ is close to zero for desirable piston-working fluid combinations, and thus cosθ will be taken as equal to 1 to calculate the maximum capillary force $F_{mc}$.

The maximum operating pressure of the actuator is given by setting the force of the vapor pressure P on the capillary meniscus equal to the capillary force. Assume that the cylinder bore is round in cross section, and that its radius is αr, r still being the radius of the piston. The force on the capillary meniscus is then $\pi(\alpha 2-1) r^2$ P. This gives $$P_{max}=2(\alpha+1)\gamma/(\alpha^2-1)r \tag{2}$$

or roughly 140/r dynes/cm2 when α=2. (Alternately, $P_{max} \approx 140,000/r$Pa, or 20/r psi when r is in microns.) As small operating pressures are difficult to control particularly with external control units, this argues toward activators of the present design having cross-sectional areas of less than about 10000 μm².

Note that the maximum capillary force $F_{mc}$ does not depend on the clearance between the cylinder bore and the piston. As this force results from the action of the pressure of the vaporized working fluid on the capillary meniscus, the vapor pressure required to produce a given capillary force on the piston depends inversely on the difference in cross-sectional area between the cylinder bore and the piston. (Small α near one gives large working pressures in Equation 2.) One consequence is that an actuator having a small value of α(i.e. near 1) may, owing to the action of the higher operating pressure on the end of the piston, actually produce more piston force than a second actuator with a large value of α, even though only the second actuator exhibits capillary dominance. Hence, capillary dominance is not a design goal. Capillary sealing, however, is required for the operation of this new class of microminiature activators. A careful look at the capillary sealing mechanism is thus appropriate.

The effectiveness of a capillary seal in other than microgravity conditions clearly depends on the dimensions of the piston and cylinder bore. Trivially, if the cylinder bore is 2 meters in diameter and the piston is 1 meter in diameter, the working fluid will simply run out on the floor, leaving an nonfunctional device. This is why O-rings and the like were developed, to allow conventional devices to use capillary sealing effects. The question of stability of a capillary seal is a critical design problem, and must be addressed to let one skilled in the art practice the current invention without undue experimentation.

As illustrated in FIG. 2, the force of gravitation on the working fluid acts to increase the pressure at the bottom of the cylinder bore 20 compared to that at the top of the cylinder bore 21 by 2pαgr, where ρ is the density of the working fluid 22 and g is the acceleration due to gravity or other influences (such as vibration). This pressure is offset by the capillary force developed by distorting the shape of the capillary meniscus 23 and its angles of contact with the piston and the cylinder bore. This force is difficult to calculate exactly, but it will produce a maximum pressure of perhaps 5–10% of the maximum working pressure Pmax in opposition to the force of gravity. Using this estimate, one can establish design rules for the maximum clearance between cylinder bore and piston as a function of piston radius. The maximum clearance δ between cylinder bore and piston is (α–1) r, where αr is the cylinder bore radius and α obeys the expression below:

$$\alpha(\alpha^2-1) \leq 0.1\gamma/\rho g r^2; \alpha>1. \tag{3}$$

Equation 3 is one example of a design rule for clearance of a device which depends on capillary sealing. Clearly different orientations and external conditions will produce different rules, but they will always depend on the type of force balancing argument outlined above, which can be easily adapted by one skilled in the art.

Equation 3 can be solved by any of a number of iterative techniques for nonlinear equations or by direct solution of the third-order polynomial equation. If we assume the need to contain fluid under accelerations of 10 Gs and use water as the working fluid, we find that $\alpha_{max}(\alpha_{max}^2-1) \approx 10^5 r^{-2}$ where r is measured in microns. The earlier discussion of maximum working pressure suggested that r should not be more than about 100 μm. For this case, $\alpha_{max} \approx 2.3$, and the maximum clearance δ≈130 μm. In contrast, if r=1 μ m under the same conditions, $\mu_{max} \approx 50$, giving a maximum clearance δ≈49 μm. It is clear that actuators of the present type having a reasonable working pressure will have little problem in sealing the working fluid using only capillary action.

The nature of the cylinder bore is important in design of miniature activators of the above design. The principal factor driving cylinder bore design is that smooth piston motion is desired, even when moving against an external load. This consideration has several consequences. For example, the cylinder bore should be reasonably smooth, so that the capillary meniscus can slide freely as the vapor bubble expands. Roughness of the cylinder bore will produce some degree of stick-slip piston motion. As was discussed briefly above, the bore can take any number of cross-sectional shapes. Micromachining techniques lend themselves most easily to roughly square or rectangular bores.

A more important criterion, however, is that the cross-sectional area of the cylinder bore should be essentially constant along its length, or at least along that portion of its length designed to interact with the capillary meniscus. The reason is that the total force transmitted to the piston is a function of the vapor pressure multiplied by the cross-sectional area of the cylinder bore at the location of the piston shoulder. Consider the case, illustrated schematically in FIGS. 3A–3C, where there is a restoring force on the piston 44. (For simplicity we will assume here that the actuator 40 is lifting a weight 45. The restoring force represented by element 45, however, need not be constant for the following discussion to be valid in essence.) The cross-sectional area of the lower cylinder bore 41 is 1, that of the middle cylinder bore 42 is 0.5, and that of the upper cylinder bore 43 is 1 again. (The piston 44 is centered and small enough to move axially without making contact with the cylinder bore.)

In FIG. 3A, the capillary meniscus 49 is in the lower cylinder bore 41, so that a certain constant vapor pressure P is needed to keep the piston 44 steady against the external load 45. The pressure and volume of the vapor 48 are controlled by adjusting the power of the heating means 47, and thereby the amount of the working fluid 46 which is vaporized. To move the piston 44, e.g., outward, the power delivered by the heating means 47 is increased so that the equilibrium volume of vapor 48 having pressure P is larger than in the initial condition.

In FIG. 3B, the capillary meniscus 49 has reached the intersection between the lower cylinder bore 41 and the middle cylinder bore 42. At this point, the cross-sectional area of the cylinder bore is reduced abruptly to half of its original value. As a result, the vapor pressure required to support the external load 45 beyond the constriction increases to $\sqrt{2}P$, because the force transmitted to the piston 44 is a function of the pressure of the vapor 48 multiplied by the cross-sectional area of the cylinder bore. On reaching this transition point between lower and middle cylinder bores, further outward motion of the piston 44 will not occur until the pressure of the vapor 48 has increased from its original value. (The increased pressure is indicated by the higher density of the vapor 48 in FIG. 3B.) A considerable increase in the power delivered by the heater means 47 is required to produce the required increase in pressure. In effect, then, the actuator 'sticks' in a certain range of heater power before outward motion once again continues.

Once the vapor pressure is increased to $\sqrt{2}P$, the piston 44 is again free to respond to changes in heater input 47. Now consider the situation shown in FIG. 3C where the piston 44 has moved far enough out that the capillary meniscus 49 enters the upper cylinder bore 43. As the cross-sectional area of this region is again equal to 1, the actuator suddenly has $\sqrt{2}$ times the vapor pressure required to support the external load 45. The piston 44 responds by moving outward until the pressure of the vapor 48 is reduced to P. Depending on the geometry of the cylinder bore and pressure chamber, this may require a great deal of piston motion. Large changes in cylinder bore cross-sectional area thus produce dramatic 'stick-slip' type piston motion.

The 'stick-slip' phenomenon described above can be used to the designer's benefit in certain circumstances. It is possible to use this effect to help retain the piston in the cylinder bore. Consider again the operation of the actuator shown in FIG. 4. When the capillary meniscus 49 is in the lower cylinder bore 41, the motion of the piston 44 in and out of the actuator is smoothly controlled by the power delivered by the heating means 47 (the method for such control is not shown here). When the capillary meniscus 49 reaches the point of transition between the lower cylinder bore 41 and the middle cylinder bore 42, however, no further motion will occur until the power delivered by the heating means 47 is greatly increased. The relevant power levels can be calibrated for any given actuator design, and incorporated into the design of the controlling means for the heating means 47 so that adequate heating power to drive the capillary meniscus 49 into the middle cylinder bore 42 cannot be delivered. In this case (for which the upper cylinder bore 43 is not necessary), the presence of a known (not necessarily constant) restoring force and the change in the cross-sectional area of the cylinder bore combine to retain the piston in the actuator.

The 'stick-slip' phenomenon can also be used to deliver an impact to a target when the piston 44 'slips' into the upper cylinder bore 43, rather like a miniature hammer. When the capillary meniscus 49 moves into the upper cylinder bore 43, the piston is suddenly subject to a force greater than the restoring force (twice the restoring force, in the example). This excess force will accelerate the piston 44, which will deliver a blow to a target whose magnitude depends primarily on the properties of the restoring means, the amount of piston travel following the initial 'slippage', and the volume of high pressure vapor (determined by the design of the actuator). Such blows against a piezoelectric element would generate an electrical pulse when the power to the heater means 47 exceeds a given value, the system thus generating a control signal or acting as a stage in an analog to digital converter.

In a similar manner, changes in the cross-sectional shape of the cylinder bore that leave the cross-sectional area constant will also produce 'stick-slip' piston motion. The cause is the excess energy required to distort the initial meniscus shape into the shape required by the new cross-sectional shape. This source of 'stick-slip' motion is much smaller in magnitude than that resulting from significant changes in cross-sectional area, but must still be considered in design of actuators of the present type for precision applications.

Having completed the discussion of the capillary sealing/drive mechanism, we now introduce useful variations in the basic actuator mechanism. As shown in FIG. 4, the same basic principle of capillary action can be applied to make an actuator having an arbitrary number of cylinder bore-piston pairs 51–52. All such pairs in a given actuator are in common contact with a single pressure chamber 50 containing a heating means 53. The unit is initially filled by a working fluid 54, within which is formed, by action of the heating means 53, a vapor bubble 55. When the vapor bubble 55 intersects the respective pistons 52, capillary menisci 56 form between the walls of the cylinder bores 51 and the end of the respective pistons 52 proximate to the vapor bubble 55. These capillary menisci 56 transfer force to the respective pistons 52.

Because the cylinder bores 51 are all connected to a common pressure chamber 50, they are all driven by the same vapor pressure P. When the vapor bubble 55 is too small to contact the pistons 52, said pistons experience an outward force equal to their cross-sectional area multiplied by P. The vapor pressure $P_{init}$ required to increase the volume of the vapor bubble can be approximately determined from Equation 1 to be $2\gamma/\alpha$ r. (This is simply the maximum capillary force on a meniscus drawn across a cylinder bore having radius $\alpha$r.) The initial outward force on the pistons 52 is thus equal to $2\pi r\gamma/\alpha$. Once the capillary menisci 56 are formed, however, the outward force on the pistons increases to $2\pi r\gamma$, a factor of $\alpha$ larger than the initial force. (Note that this implies that when multiple cylinder bore-piston pairs are involved, the vapor bubble will grow to form the desired capillary menisci 56 before any of the pistons experiences an outward force greater than the $2\pi r\gamma$ value.) The capillary menisci 56 also serve as sealing means which allow the vapor pressure P to be increased, thus increasing the outward force on the pistons 52 as described by Equations 1 and 2.

The principles of operation and design having been described above, attention is now turned toward specific embodiments of the various subsystems. These are chosen to illustrate general features, and not to thereby limit the scope of the present invention.

Figure 5B:
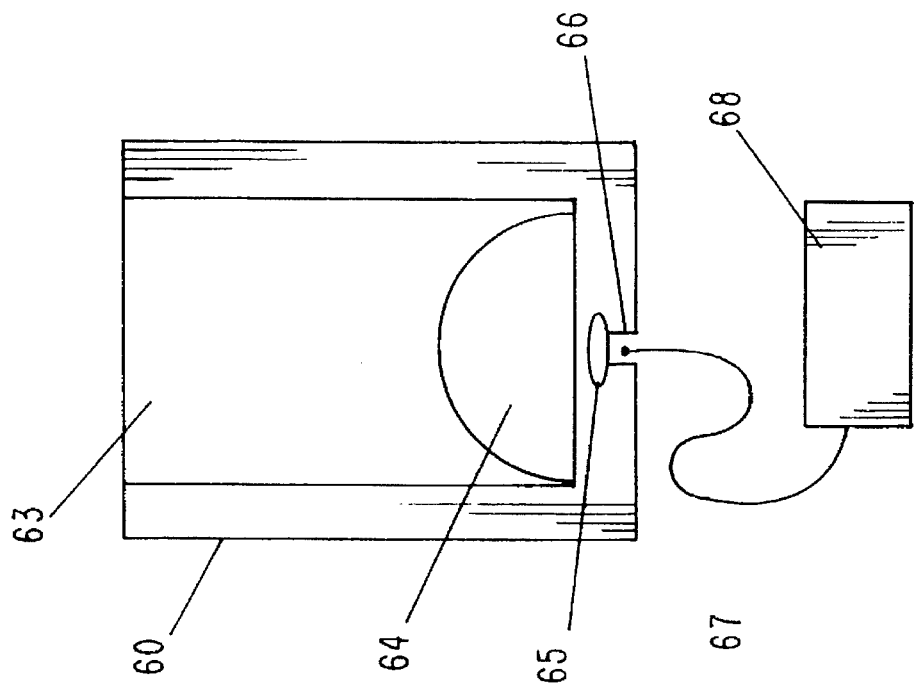
FIGS. 5A and 5B are cross section views showing two general approaches toward forming a vapor bubble in an actuator by vaporizing the working fluid.
Figure 5A:
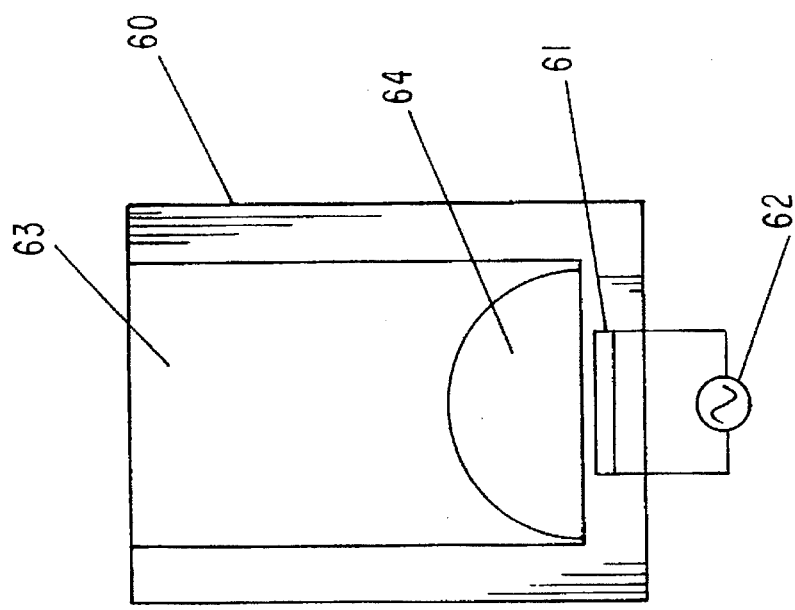

Two possible heating means for forming vapor bubbles by local heating are illustrated in FIGS. 5A and 5B. In FIG. 5A an electrical heating means is illustrated. The actuator body 60 has a resistance element 61 attached, embedded, or otherwise incorporated into its physical structure. In the embodiment shown, the resistance element 61 is embedded in the actuator body 60. The resistance element 61 is connected to a power controlling means 62, which provides electrical power to said resistance element. The actuator body is filled with a working fluid 63. The heat from the resistance element 61 has partially vaporized the working fluid, creating the vapor bubble 64. (A vapor bubble forms because of surface tension and the dynamics of heat transport in this type of device.) Any cylinder bore-piston pairs functionally connected to this assembly are not shown.

The flow of heat in and around the actuator body 60 is driven by the input of heat into the actuator body from the resistive element 61, removal of heat from the actuator body by conductive, convective, and radiative transfer with the surroundings of the actuator body, and conductive and convective transfer within the working fluid 63 and the vapor bubble 64. As a result, modeling the performance of any given actuator design and application is a difficult problem whose details differ for each application. A general rule, however, is that more power from the power controlling means 62 produces a bigger vapor bubble 64. This will be true providing that the surroundings of the actuator remain thermally static and that neither the working fluid nor the vapor make a transition to turbulent material flow (which would change the amount of internal heat transfer). In difficult cases, it is possible to arrange a feedback signal from the piston motion or piston force back to the power controlling means 62 to maintain the relevant device parameter at the desired value, which may be a function (possibly multivariable) of time and/or other functional parameters.

FIG. 5B schematically illustrates the use of an optical heating means. An optical absorbing region 65 is in thermal contact with the actuator body 60. An access hole 66 allows the light output of a fiber-optic waveguide 67 to contact the optical absorbing region 65. The input end of the fiber-optic waveguide 67 connects to an optical controlling means 68, which provides a source of light with sufficient power to heat the optical absorbing region 65 sufficiently to vaporize the working fluid 63, thus forming a vapor bubble 64. The intricacies of control are much as described above. Note that this is only one embodiment of an optical heating means.

The fiber-optic waveguide 67 can be replaced or augmented by any of a number of optical contrivances, specifically including systems comprising lenses, mirrors, and gradient-index optics, which serve the purpose of coupling the output of the optical controlling means 68 to the optical absorbing region 65. Also, the optical controlling means 68 may be any suitable optical source, including lasers, LED's, and incandescent bulbs.

Figure 6:
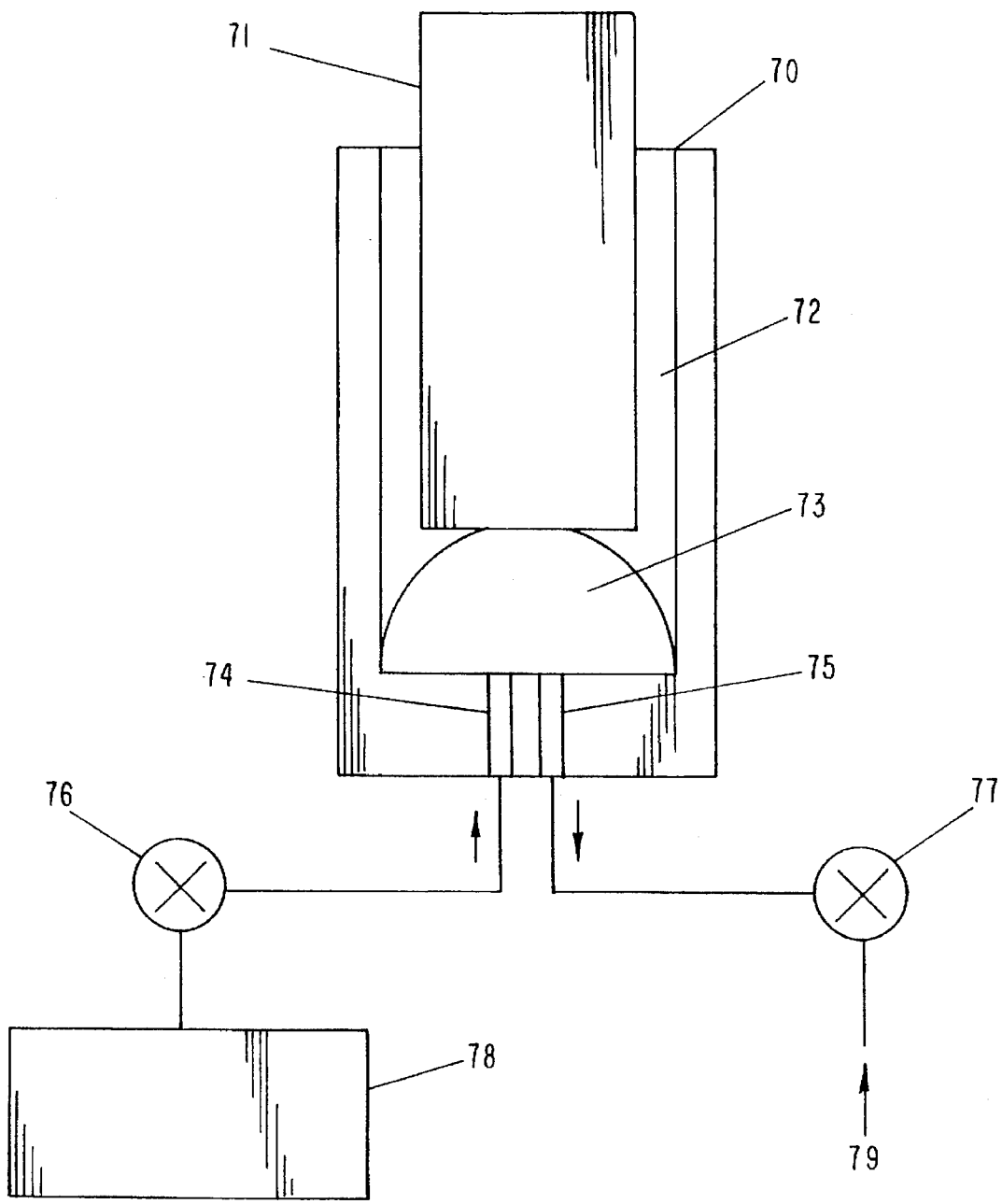
FIG. 6 is a schematic cross sectional of an embodiment employing an external source of gas to drive the piston.

In the discussion of FIG. 1 above the possibility of forming a vapor bubble in a microminiature activator of the type described herein by balancing gas flow in and out of the pressure chamber of the actuator in order to maintain a constant volume of gas at a constant pressure. Such a bubble forming means is illustrated in FIG. 6. This FIG. shows an actuator having a cylinder bore 70 and a piston 71, containing a working fluid 72. There is also a gas bubble 73. This gas bubble is not composed primarily of the vapor of the working fluid 72, but rather of gas injected through input aperture 74. The source of this gas is pressurized reservoir 78, and the rate of gas flow into the gas bubble 73 is controlled by feed valve 76. The gas could also come from another external source or from an on-chip gas pump. The gas making up the gas bubble 73 is free to escape the bubble through output aperture 75. Note that the surfaces of the capillary bore 70 proximate to the input and output apertures 74 and 75, and the surfaces of these selfsame apertures, must be treated so that the working fluid does not wet said surfaces. Otherwise a capillary meniscus will form across output aperture 75, forming an effective high-pressure seal against gas flow from gas bubble 73. (The seal pressure is high relative to the working pressure of the actuator because the cross-sectional area of the output aperture 75 is small compared to that of the capillary bore 70.) Suitable surface treatments would include a thin film of low-friction polymer (e.g., PTFE) or a self-organizing monolayer with inactive end groups.

The amount of gas which can escape per time interval is proportional to the product of the conductance $\beta_b$ of the bleed valve 77 and the difference in the pressure in the gas bubble 73 and the environment into which exhaust tube 79 exits. Similarly, the amount of gas which can enter the bubble from the pressurized reservoir 78 per time interval is proportional to the conductance $\beta_f$ of the feed valve 76 and the difference in the pressure of the reservoir 78 and the gas bubble 73. These valves are adjustable so that the conductances can be changed at will.

To maintain a given amount (number of atoms) of gas in the gas bubble 73, the flow rate into the bubble should equal the flow rate out. This condition leads to the equation $$P=(\beta_f P_i + \beta_b P_o)/(\beta_f + \beta_b) \quad (5)$$

where P is the pressure in the gas bubble, $P_i$ is the pressure in the pressurized reservoir 78, $P_o$ is the pressure to which the exhaust tube 79 discharges, and where there is no absorption of gas into the working fluid. The pressure and volume of the gas bubble 73 will thus remain constant when this condition is fulfilled. The combined use of the feed and bleed valves 76 and 77 thus allows control over the size and pressure of the gas bubble 73. Such a control scheme is most likely to be of use in fluidic applications, but there is no fundamental reason that this scheme, and others obvious to those skilled in the art, may not be implemented using electronic or mechanical control.

Maintaining alignment of the actuator piston is of concern in some subclasses of the present invention, and should thus be discussed briefly. Although the magnitude of the restoring force is difficult to estimate, it is unlikely that this effect will be adequate to maintain acceptable piston alignment in all devices. Several other possibilities will thus be discussed here. This discussion is not intended in any way to limit the invention beyond the claims presented.

FIGS. 7A–7E show two possible ways beyond capillary deformation in which piston alignment can be maintained. The first (FIGS. 7A–7C) is a brute force use of aspect ratio. If the length L of the piston 82 remaining in the actuator 80 at its maximum extension is much greater than the clearance between the piston 82 and the cylinder bore 81, said piston will not be free to move more than $\beta/L$ radians out of alignment with the axis of the cylinder bore. This misalignment angle can be made as small as required through proper design of the actuator. This is illustrated by the misalignment of the two tilted pistons; the tilt of the piston in the short actuator is clearly more than that of the piston in the longer actuator.

The above scheme has certain limitations, however. It works best when the cylinder bore has smooth walls, when the piston has no sharp edges, and when the cross-sectional shapes of the piston and cylinder bore are similar. As these conditions deteriorate, an activator depending on the above scheme for piston alignment will experience stick-slip motion, possibly to the extent of jamming the actuator. The technique also requires actuators having large (for this microscopic regime) dimensions. This approach will be of use in some situations, but other alignment means must be available for more general application of this class of microminiature linear actuators.

Another approach is shown in FIGS. 7D and 7E. This again depends on material interference for its effect, but in this case a plurality of lands 84 are raised on the surface of the piston 83. The lands 84 restrict the lateral motion of the piston, thus maintaining the desired piston alignment. (In some cases the piston may actually ride upon certain of the lands; this, however, is not required.) The lands must offer enough clearance for free linear motion of the piston in the cylinder bore, but the degree of clearance required may be a small fraction of the piston-cylinder bore clearance. As a result, this scheme gives much better alignment than that of FIGS. 7A–7C, and allows alignment specifications to be met in a smaller actuator. Formation of the lands on the piston is a difficult matter however with conventional silicon micromachining processes. Although the lands 84 can in principle be placed on the walls of the cylinder bore 85 as suggested in the FIG., there is some danger in that case of said lands producing a 'stick-slip' motion owing to the resulting variation in the cross-sectional area of the cylinder bore (see discussion of FIG. 3 above). If the lands 84 must be on the walls of the cylinder bore 85 for some other design requirement, the 'stick-slip' effect can be minimized by proper placement of the lands, i.e., so that the average cross-sectional area of the cylinder bore 85 with lands 84 is approximately constant. Variations on the above embodiments are possible, and the above discussion is not intended to limit the claimed material.

A demonstration actuator has been constructed possessing the characteristic features of the present invention. Further, this demonstration actuator was constructed using conventional silicon microfabrication and micromachining technology. Accordingly, a detailed description of this demonstration actuator appears below. This description is not intended to limit the scope of the claimed invention, but rather to demonstrate that a member of the class of claimed inventions functions in accord with expectations.

Figure 8:
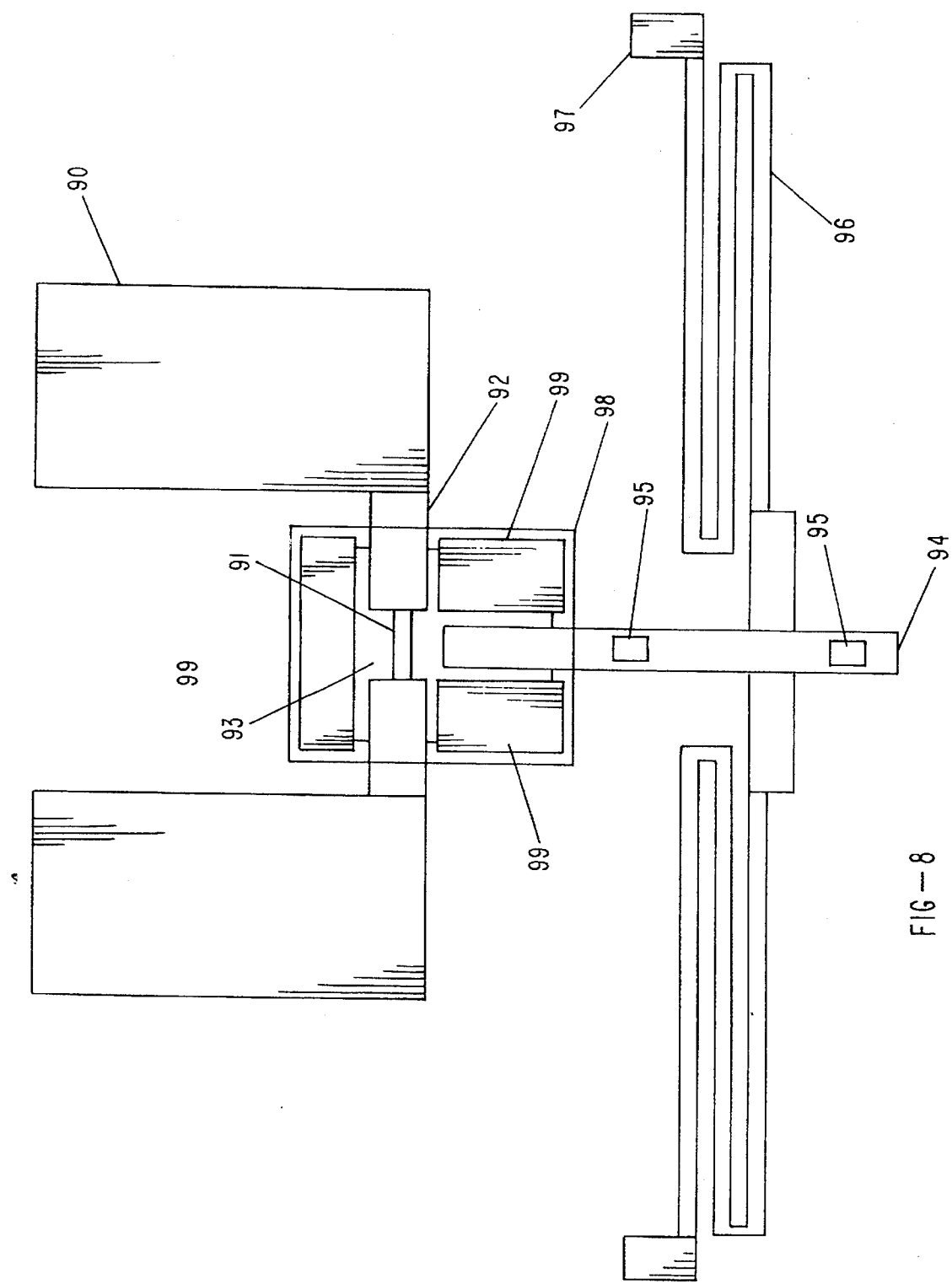
FIG. 8 is a top view of a demonstration actuator fabricated using surface micromaching techniques.

The actuator is produced using a multilayer deposition and etching process on a silicon wafer. Specifically, two polycrystalline silicon depositions separated by a patterned and etched sacrificial glass layer are used to form the actuator. The heater element with contact pads, the piston, and the restoring spring with anchor areas are made using the first polysilicon deposition. The cylinder cap with anchor areas is made with the second polysilicon deposition. The moving components, which comprise polycrystalline silicon, are freed from the solid composite by etching away sacrificial layers of $SiO_2$. The top view of the actuator design appears in FIG. 8. All elements shown are made of polysilicon, but three different areas of the device are emphasized. The darkest are in direct contact with the silicon substrate, the light areas are the suspended moving elements (and the heater), and the outlined area 98 surrounding the heater-piston area is a cap formed over these elements to enclose them. Contact pads 90 provide a means for making electrical contact to heating element 91. Polysilicon contacts 92 make contact with the heating element 91, but the smaller cross-sectional area of element 91 concentrates the majority of the heat production in that element. The heating element 91 heats the working fluid 93 to form a vapor bubble. Water has been used with success, but it is possible that other fluids such as chlorofluorocarbons or low-viscosity oils may work better.

The piston 94 is 6 µm wide and 2 µm high, and is designed for a total travel of 10 µm. Said piston is restrained by springs 96 so that at rest, one end of the piston is immersed in the working fluid 93. The springs provide a restoring force to piston motion, and also allow the force produced by the actuator to be measured. The springs are anchored in place by anchor pads 97, which are fixed to the substrate. The piston 94 is constructed with a plurality of lands 95 (two in this specific instance) on the surface of the piston proximate to the silicon substrate. Cap layer 98, in consort with anchor areas 99, forms a chamber over the heating element 91, the working fluid 93, and one end of the piston. This configuration has produced over 1 µN of force, in excellent agreement with the model for capillary sealing, and has operated for hundreds of cycles without apparent loss of working fluid.

The techniques used to form the above structure are well-known in the art, and hence will not be described in detail. However, a listing of the process used is helpful in understanding the structure seen in FIG. 8. Unless mentioned, standard etching procedures are used to pattern layers, and layers are not patterned unless mentioned.

1. Begin with a silicon wafer.
2. Deposit $SiO_2$ to act as a dielectric layer.
3. Deposit silicon nitride (SiN) as an etch stop layer.
4. Deposit a ground plane layer of poly-Si. (This layer is patterned and etched. It is not essential to the construction of the device.)
5. Deposit a $SiO_2$ sacrificial layer. This will define an air gap when removed.
6. Protect all regions of wafer with photoresist except where piston lands are wanted. Etch partway through the $SiO_2$ layer in these regions to produce dimples.
7. Etch down to the stop etch layer formed in step 3 in regions 90 and 97 in FIG. 8.
8. Deposit 2 µm of poly-Si to form the piston 94, springs 96, and heating element 91–92 in FIG. 8. This layer must be of the proper resistivity to enable the functioning of the heating element. The poly-Si also fills the dimples formed in the $SiO_2$ layer in step 6 to form the piston lands 95.
9. Etch the poly-Si layer to form the shapes shown in FIG. 8.
10. Deposit $SiO_2$ (another sacrificial layer).
11. Etch regions 99 down to the stop etch layer formed in step 3.
12. Deposit 1 µm of poly-Si.
13. Etch the poly-Si layer to form the cap 98 over the piston 94 and the heating element 91–92.
14. Remove all $SiO_2$ in an HF dip, so that an air gap separates the piston, springs, and heating element from the surrounding poly-Si structures.
15. Flush with deionized water.

This is the endpoint of the process if water is to be used as the working fluid. As mentioned earlier, there is reason to believe that other media may work better, but these have not been examined at this time. A useful variation of step 8 in the above process list is to substitute a three-layer sandwich of doped poly-Si, poly-Si, and doped poly-Si for the 2 µm of poly-Si. If such a sandwich is annealed in place, the resulting structure is nearly stress-free, giving more design freedom. Note again that the detailed description above is of only one of a wide range of possible embodiments of the present invention, and is not intended to limit the scope of that invention.

What is claimed is:

1. A microminiature linear actuator, comprising:
   a) a body substantially impermeable to liquid and gas;
   b) a cavity within said body;
   c) at least one bore linking said cavity to the surface of said body;
   d) a companion piston for each respective bore, said companion piston having dimensions allowing non-binding linear motion of said companion piston within said respective bore;
   e) a restraining means to establish an initial position for each companion piston such that the end of the piston proximate to said cavity is within the respective bore;
   f) a working fluid filling said cavity and partially filling said at least one bore in a continuous manner so that the ends of the companion pistons proximate to said cavity are immersed in said working fluid when the companion pistons are located at their initial position, said working fluid being capable of wetting said companion pistons and said body;
   g) means for forming a gas-filled bubble of controllable size in the working fluid; and h) means for sealing said gas-filled bubble within the micromechanical linear actuator, said means comprising the action of the capillary meniscus formed at the interface between the gas-filled bubble and the working fluid.

2. The device of claim 1, said means for forming a gas-filled bubble comprising a thermal source.

3. The device of claim 2, said thermal source comprising an electrical resistance heater and an electrical controlling means.

4. The device of claim 3, said electrical resistance heater to comprise polysilicon.

5. The device of claim 2, said thermal source comprising an optically powered element and an optical controlling means.

6. The device of claim 1, said means for forming a gas-filled bubble comprising a source of compressed gas, an input valve, and a bleed valve, and access apertures for injection and removal of gas from the cavity of the actuator.

7. The device of claim 6, said apertures and the regions of the cavity proximate to the apertures being subjected to a non-wetting treatment to avoid wetting by the working fluid, said non-wetting treatment comprising a coating of low friction coefficient polymer.

8. The device of claim 6, said apertures and the regions of the cavity proximate to the apertures being subjected to a non-wetting treatment to avoid wetting by the working fluid, said non-wetting treatment comprising a self-assembling monolayer with exposed end groups incompatible with the working fluid.

9. The device of claim 1, said restraining means comprising means to generate an external restoring force.

10. The device of claim 9, said means to generate an external restoring force comprising a spring.

11. The device of claim 1, further comprising restricting means to prevent each said companion piston from totally exiting said at least one hole.

12. The device of claim 11, said restricting means comprising a spring.

13. The device of claim 11, said restricting means comprising a stop.

14. The device of claim 11, said restricting means comprising a constriction in said at least one hole proximate to the intersection of said at least one hole and the external surface of the actuator body, said constriction still allowing non-binding linear motion of the companion piston.

15. The device of claim 1 further including means to align each piston with its bore.

16. The device of claim 15, said alignment means comprising a spring.

17. The device of claim 15, said alignment means comprising material interference between said at least one hole and said companion piston.

18. The device of claim 17, said companion piston comprising lands.

19. The device of claim 17, said at least one hole comprising lands.

20. The device of claim 1, said external environment comprising a gaseous atmosphere.

21. The device of claim 20, further comprising means for sealing said working fluid within the micromechanical linear actuator, said means comprising the capillary meniscus formed at the interface between said working fluid and said gaseous atmosphere.

22. The device of claim 1, said external environment comprising a liquid immiscible in the working fluid.

23. The device of claim 1, said external environment comprising a liquid miscible and compatible with the working fluid.

24. The device of claim 1, each at least one bore having approximately constant cross-sectional shape and area.

25. The device of claim 1, further comprising at least one of said at least one bores having an intermediate constriction zone proximate to neither end of the bore, said constriction still allowing non-binding linear motion of the piston in the bore.

* * * * *

UNITED STATES PATENT AND TRADEMARK OFFICE
CERTIFICATE OF CORRECTION

PATENT NO. : 5,649,423
DATED : Jul. 22, 1997
INVENTOR(S) : Sniegowski

It is certified that error appears in the above-identified patent and that said Letters Patent is hereby corrected as shown below:

Column 1, line 3, after the heading "Background" insert the following –

This invention was made with Government support under Contract DE-AC04-94DP85000 awarded by the U.S. Department of Energy. The Government has certain rights in the invention.--

Signed and Sealed this

Twenty-seventh Day of July, 1999

*Attest:*

*Attesting Officer*

Q. TODD DICKINSON

*Acting Commissioner of Patents and Trademarks*